United States Patent [19]
Fujita

[11] Patent Number: 6,163,331
[45] Date of Patent: Dec. 19, 2000

[54] METHOD OF CORRECTING LIGHT QUANTITY IN AN OPTICAL WRITING APPARATUS

[75] Inventor: Atsushi Fujita, Kusatsu, Japan

[73] Assignee: Minolta Co., Ltd., Osaka, Japan

[21] Appl. No.: 09/293,791

[22] Filed: Apr. 20, 1999

[30] Foreign Application Priority Data

Apr. 21, 1998 [JP] Japan .................................. 10-110802

[51] Int. Cl.[7] .................................................. B41J 2/435
[52] U.S. Cl. .......................... 347/236; 347/246; 347/240; 347/251; 250/559.03; 250/559.05; 355/35
[58] Field of Search ..................................... 347/236, 237, 347/248, 240, 246, 251; 355/31, 35, 38, 68, 41, 71; 250/205, 559.03, 559.05

[56] References Cited

U.S. PATENT DOCUMENTS 5,684,568  11/1997  Ishikawa et al. ........................ 355/68
5,706,075   1/1998  Ishikawa et al. ........................ 355/35
5,790,240   8/1998  Ishikawa et al. ........................ 355/68

*Primary Examiner*—N. Le
*Assistant Examiner*—Hai C. Pham
*Attorney, Agent, or Firm*—McDermott, Will & Emery

[57] ABSTRACT

In a method of correcting output light quantities of a plurality of optical output media aligned in one direction in an optical writing apparatus that activates and deactivates the optical output media in multi-gradation to thereby perform optical writing onto an object onto which writing is to be performed, the quantity of light outputted from each of the optical output media is measured, and a variation in the output light quantities of the optical output media is corrected based on a result of the measurement. In performing the correction, in a specific gradation range, correction is performed so that the output light quantities of the optical output media are not made uniform.

14 Claims, 16 Drawing Sheets

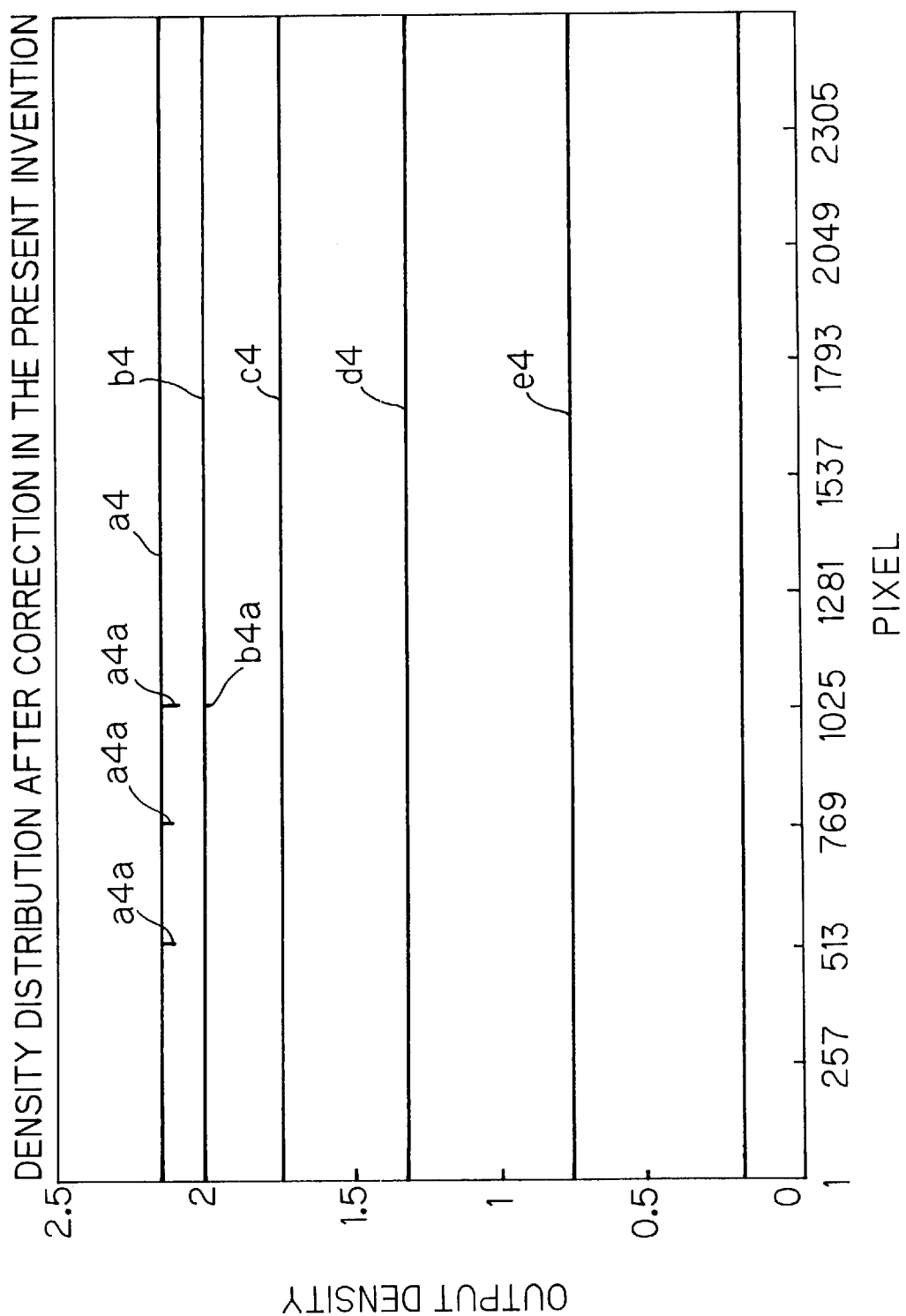

LIGHT QUANTITY DISTRIBUTION AT THE TIME OF CORRECTION IN THE PRIOR ART

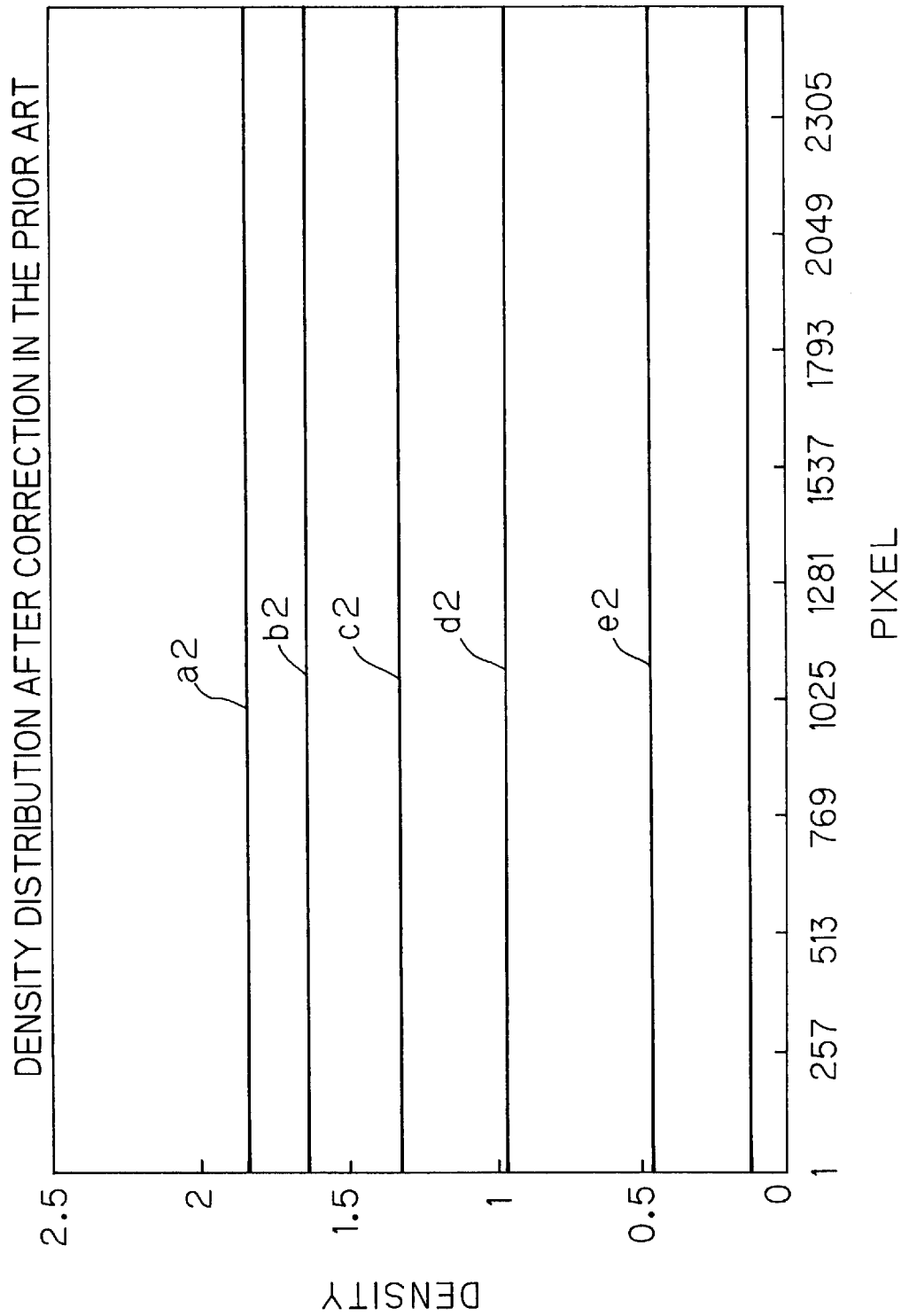
FIG. 16 DENSITY DISTRIBUTION AFTER CORRECTION IN THE PRIOR ART

METHOD OF CORRECTING LIGHT QUANTITY IN AN OPTICAL WRITING APPARATUS

This application is based on application No. H10-110802 filed in Japan, the entire content of which is hereby incorporated by reference.

BACKGROUND OF THE INVENTION

1. Field of the Invention

The present invention relates to a method of correcting the light quantity of an optical writing apparatus, said apparatus being used for digital printers and the like.

2. Description of the Prior Art

As a solid-state scanning optical writing apparatus, an array type using optical output media such as LEDs, PLZT, fluorescers and liquid crystal, etc. aligned in one direction has conventionally been known.

In optical output media used in the conventional solid-state scanning optical writing apparatus, optical outputs such as light emission and light transmission vary among pixels. This variation is generally a combination of a random variation and a periodical variation. FIG. 14 shows an example of the variation, among pixels, in the quantity of transmitted light of a print head using PLZT as a light quantity distribution of the optical outputs. As is apparent from FIG. 14, the light quantity variation conditions in the gradation ranges are substantially analogous.

Conventionally, to correct such a variation in the light quantities of the optical outputs, normally, with the darkest pixel or region in the solid-state scanning optical writing apparatus as the reference, the output levels of other bright pixels are reduced so that the light quantity levels of all the pixels are made uniform. For example, the highest output level of the light quantity distribution in the gradation range shown by a in FIG. 14 is 25000 a.u., whereas the lowest output level thereof is 15000 a.u. The output level variation is made uniform by the above-described correction so that the output levels of all the pixels are substantially 15000 a.u. which is the lowest output level as shown by a1 of FIG. 15. The highest output level of the light quantity distribution in the gradation range shown by b in FIG. 14 is 20000 a.u., whereas the lowest output level thereof is 12500 a.u. The output level variation is made uniform by the above-described correction so that the output levels of all the pixels are substantially 12500 a.u. which is the lowest output level as shown by b1 of FIG. 15. Likewise, the light quantity distribution in the gradation range shown by c in FIG. 14 is made uniform to the output level condition shown by c1 in FIG. 15 by the above-described correction. The light quantity distribution in the gradation range shown by d in FIG. 14 is made uniform to the output level condition shown by d1 in FIG. 15 by the above-described correction. The light quantity distribution in the gradation range shown by e in FIG. 14 is made uniform to the output level condition shown by e1 in FIG. 15.

Since the optical output variation among the optical output medium differs according to the color of the light, when optical writing of color images is performed, a similar correction is performed for each of the three colors of R, G and B.

When optical writing is performed, for example, onto silver halide photographic paper by the solid-state scanning optical writing apparatus while performing such an optical output correction, an output density is obtained where there is no influence of the variation in the light quantities of the optical outputs of the optical output media as shown in FIG. 16. The density distribution shown by a2 in FIG. 16 corresponds to the gradation range shown by a1 in FIG. 15. The density distribution shown by b2 in FIG. 16 corresponds to the gradation range shown by b1 in FIG. 15. The density distribution shown by c2 in FIG. 16 corresponds to the gradation range shown by c1 in FIG. 15. The density distribution shown by d2 in FIG. 16 corresponds to the gradation range shown by d1 in FIG. 15. The density distribution shown by e2 in FIG. 16 corresponds to the gradation range shown by e1 in FIG. 15.

However, in the above-described conventional correction, the larger the output level variation in a head is, the more of the steps of gradation of all are sacrificed. For example, the average output level at the light quantity distribution in the gradation range shown by a in FIG. 14 is approximately 23000 a.u. and this is reduced to 15000 a.u. by the above-described correction, so that only approximately 65.52% of the actual gradation range can be used. Consequently, the number of steps of gradation is reduced, so that the substantial contrast which is the ratio between the highest output light quantity and the light quantity at the time when the apparatus is off is reduced. Moreover, a so-called pseudo gradation occurs in which gradation joints appear in images. Thus, the above-described correction has problems in the reproducibility of multi-value images such as color images.

SUMMARY OF THE INVENTION

An object of the present invention is to provide a light quantity correcting method in which a variation in the light quantities of the outputs can be corrected to a degree that does not cause any problem by curbing the reduction in the number of steps of gradation and the reduction in substantial contrast in a solid-state scanning optical writing apparatus.

To achieve the above-mentioned object, according to one aspect of the present invention, in a method of correcting output light quantities of a plurality of optical output media aligned in one direction in an optical writing apparatus that activates and deactivates the optical output media in multi-gradation to thereby perform optical writing onto an object onto which writing is to be performed, the quantity of light outputted from each of the optical output media is measured, and a variation in the output light quantities of the optical output media is corrected based on a result of the measurement. In performing the correction, in a specific gradation range, correction is performed so that the output light quantities of the optical output media are not made uniform.

According to another aspect of the present invention, in a method of correcting output light quantities of a plurality of PLZT optical shutters in an optical writing apparatus that activates and deactivates the optical output media in multi-gradation to thereby perform optical writing onto an object onto which writing is to be performed, the quantity of light outputted from each of the optical output media is measured, and a variation in the output light quantities of the optical output media is corrected based on a result of the measurement. In performing the correction, in a specific gradation range, correction is performed so that the output light quantities of the optical output media are not made uniform.

BRIEF DESCRIPTION OF THE DRAWINGS

This and other objects and features of this invention will become clear from the following description, taken in conjunction with the preferred embodiments with reference to the accompanied drawings in which:

FIG. 9 is a graph showing the output density distribution of photographic paper onto which optical writing is to be performed while performing the correction of FIG. 8;

FIG. 16 is a graph showing the output density of the photographic paper onto which optical writing is to be performed while performing the correction of FIG. 15.

DESCRIPTION OF THE PREFERRED EMBODIMENTS

Hereinafter, an embodiment of the present invention will be described together with examples thereof with reference to FIGS. 1 to 13 for understanding of the present invention.

Figure 3:
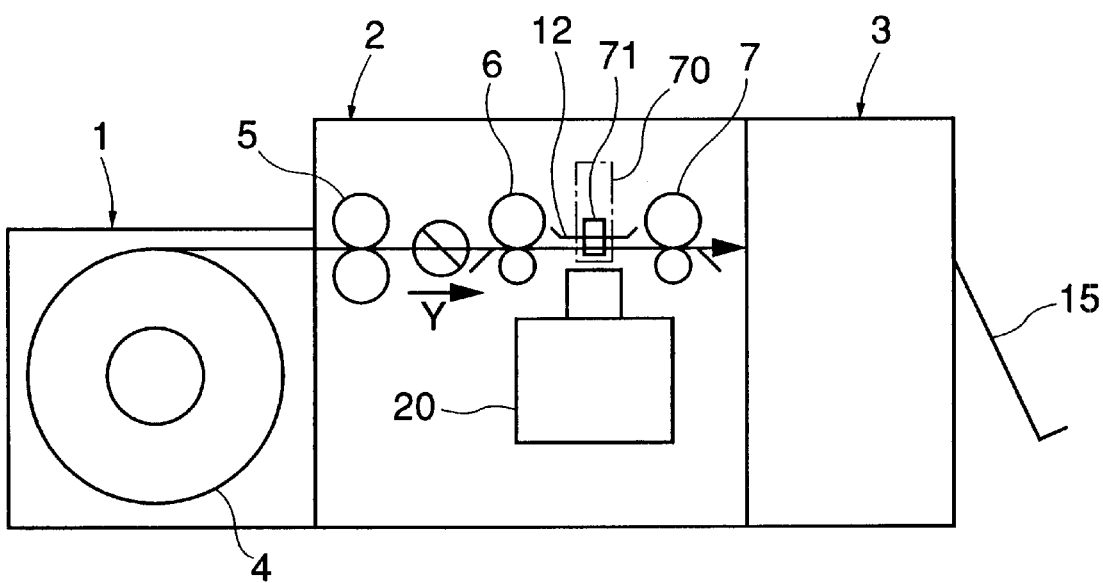
FIG. 3 briefly shows the structure of a silver halide printer employing the PLZT print head of FIG. 1.

This embodiment is an example for a case in which the present invention is applied to a solid-state scanning optical writing apparatus (hereinafter, referred to as PLZT print head) using PLZT optical shutters as optical output media and optical writing is performed onto silver halide photographic paper 4 to form color images as a silver halide printer as shown in FIG. 3. In this apparatus example, a roll of photographic paper 4 is drawn out of a housing 1 by conveyer rollers 5 and sent out to an optical writing section 12 in an exposure section 2 where a PLZT print head 20 is situated. In the optical writing section 12, optical writing of a color image is performed by the PLZT print head 20 while the photographic paper 4 is being precisely conveyed in the Y direction by conveyer rollers 6 and 7. After the writing, the photographic paper 4 is sent out to a succeeding post-processing section 3 and undergoes necessary post-processings such as development, fixing, cleaning and drying to reproduce a color image. Then, the photographic paper 4 is discharged onto a discharge tray 15. However, needless to say, the present invention is not limited thereto but is applicable to any types of solid-state scanning optical writing apparatuses using optical output media having a similar problem and having already been known or being to be developed in the future which media are capable of activation and deactivation control of optical outputs. The examples of the optical output media include illuminants and light transmitters, and light reflectors in some cases, such as LEDs, phosphors and liquid crystal. The type of the object onto which optical writing is to be performed is not limited as long as the object has a photosensitive characteristic.

Figure 1:
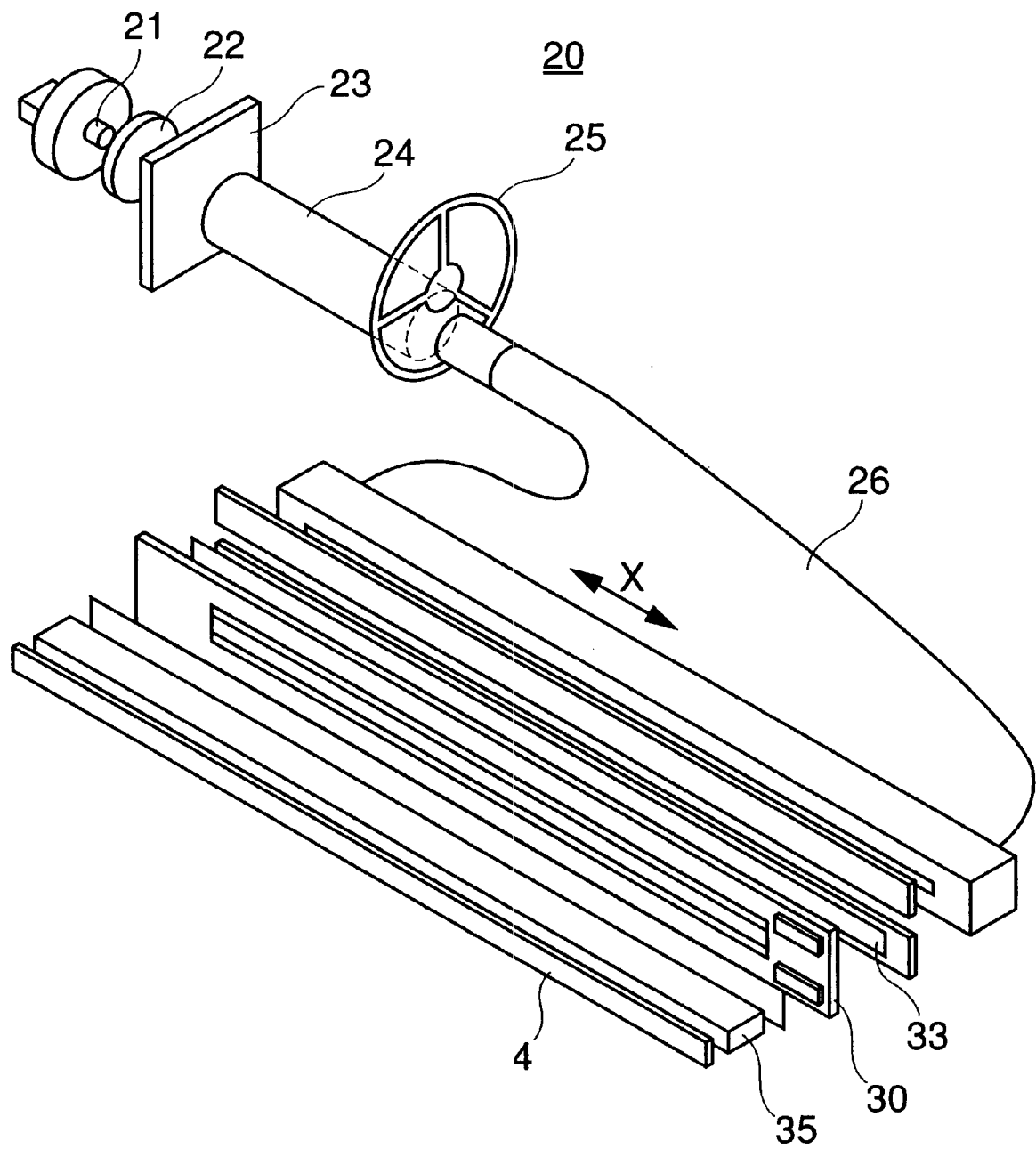
FIG. 1 is an exploded perspective view of a PLZT print head as an example of a solid-state scanning optical writing apparatus that performs a light quantity correction according to an embodiment of the present invention.

The PLZT print head 20 shown in FIG. 1 is capable of optical writing of color images, and uses light from a normal halogen lamp 21 by switching among three colors of red, blue and green according to the need by a rotation of a color filter 22. Light having passed through the color filter 22 is heat-insulation-treated by being passed through a heat absorbing filter 23, and is then formed into uniform dispersed light by being passed through a glass rod 24 and a high speed rotary disk 25 that rotates at a high speed such as 1200 rpm. Then, the light is directed through a light guide 26 such as an optical fiber to each of PLZT optical shutters $B_1$ to $B_n$ and $A_1$ to $A_n$ each corresponding to one pixel.

Figure 2:
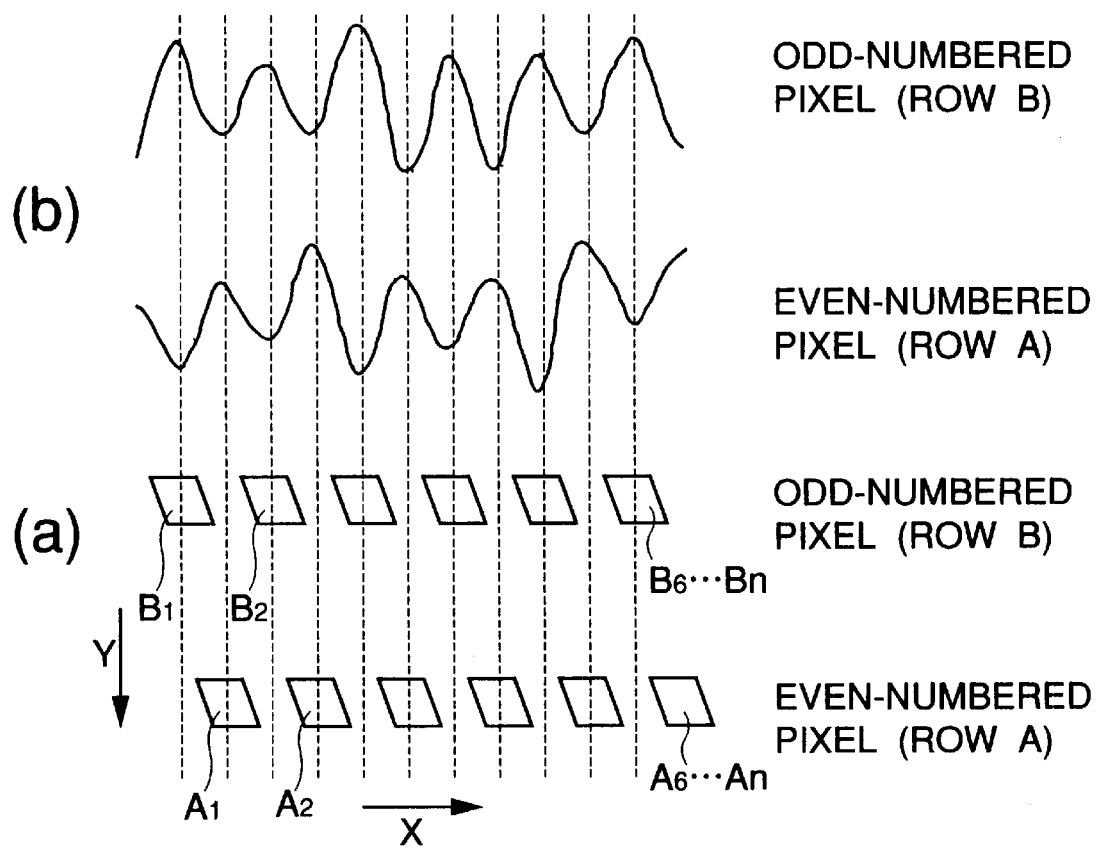
FIG. 2 shows PLZT optical shutters of the PLZT print head of FIG. 1 and the outputs thereof, (a) of which shows the arrangement of the PLZT optical shutters and (b) of which shows the condition of the outputs in accordance with the arrangement of the PLZT optical shutters.

Here, the PLZT optical shutters $B_1$ to $B_n$ and $A_1$ to $A_n$ are ceramic wafers comprising lead, lanthanum, zircon and titanium that are sintered. As an example, in order to handle the printing density and resolution of 400 dpi, a fine processing is performed in which the wafers are cut out so as to form a staggered arrangement where optical shutters aligned in one direction with the same pitch in two rows of an odd row B and an even row A as shown in (a) of FIG. 2 are shifted from each other by a half pitch. However, this is not essential.

The PLZT optical shutters $B_1$ to $B_n$ and $A_1$ to $A_n$ in the rows are used for optical writing of every other pixel in the X direction in which they are aligned. The photographic paper 4 which is the object onto which optical writing is to be performed successively undergoes optical writing in the X direction to write an image while being conveyed in the Y direction perpendicular to the X direction. Normally, the X direction is a main scanning direction, and the Y direction is a sub-scanning direction. Since there is a difference in timing of writing onto the photographic paper 4 between the PLZT optical shutters $A_1$ to $A_n$ in the row in the downstream side in the conveyance direction of the photographic paper 4 and the PLZT optical shutters $B_1$ to $B_n$ in the row in the upstream side, the writing timing is adjusted accordingly. The optical output distribution condition of the PLZT print head 20 when the PLZT optical shutters $B_1$ to $B_n$ and $A_1$ to $A_n$ in the rows are activated is shown in (b) of FIG. 2.

The PLZT optical shutters $B_1$ to $B_n$ and $A_1$ to $A_n$ are mounted on a PLZT module board 30 shown in FIG. 1 together with an IC for driving them, and transmit or do not transmit light according to the polarization direction of light between when a voltage is applied and when no voltage is applied. To use a characteristic of this, the light directed by the light guide 26 is made incident on the PLZT optical shutters $B_1$ to $B_n$ and $A_1$ to $A_n$ through a polarizing plate 33. Consequently, the PLZT optical shutters $B_1$ to $B_n$ and $A_1$ to $A_n$ transmit light when a voltage is applied and intercepts light when the voltage is turned off. The optical output transmitted by the PLZT optical shutters $B_1$ to $B_n$ and $A_1$ to $A_n$ being activated is imaged onto the photographic paper 4 through a SELFOC lens array 35 which is an example of a unity-magnification imaging lens, thereby performing the optical writing.

Here, as the gradation of the optical writing, in order that writing of color images which are multi-value images can be performed, a 1024-step gradation is used as an example. Such light quantity gradation at the time of optical writing can freely be obtained by modulating one or both of the light transmittancy and the drive time by the voltage for driving the PLZT optical shutters $B_1$ to $B_n$ and $A_1$ to $A_n$, even when the light quantity of the light source such as the halogen lamp 21 is constant. When illuminants are used as the optical output media, necessary gradation is obtained by modulating one or both of the light emission quantity and the light emission time of the illuminants.

Figure 4:
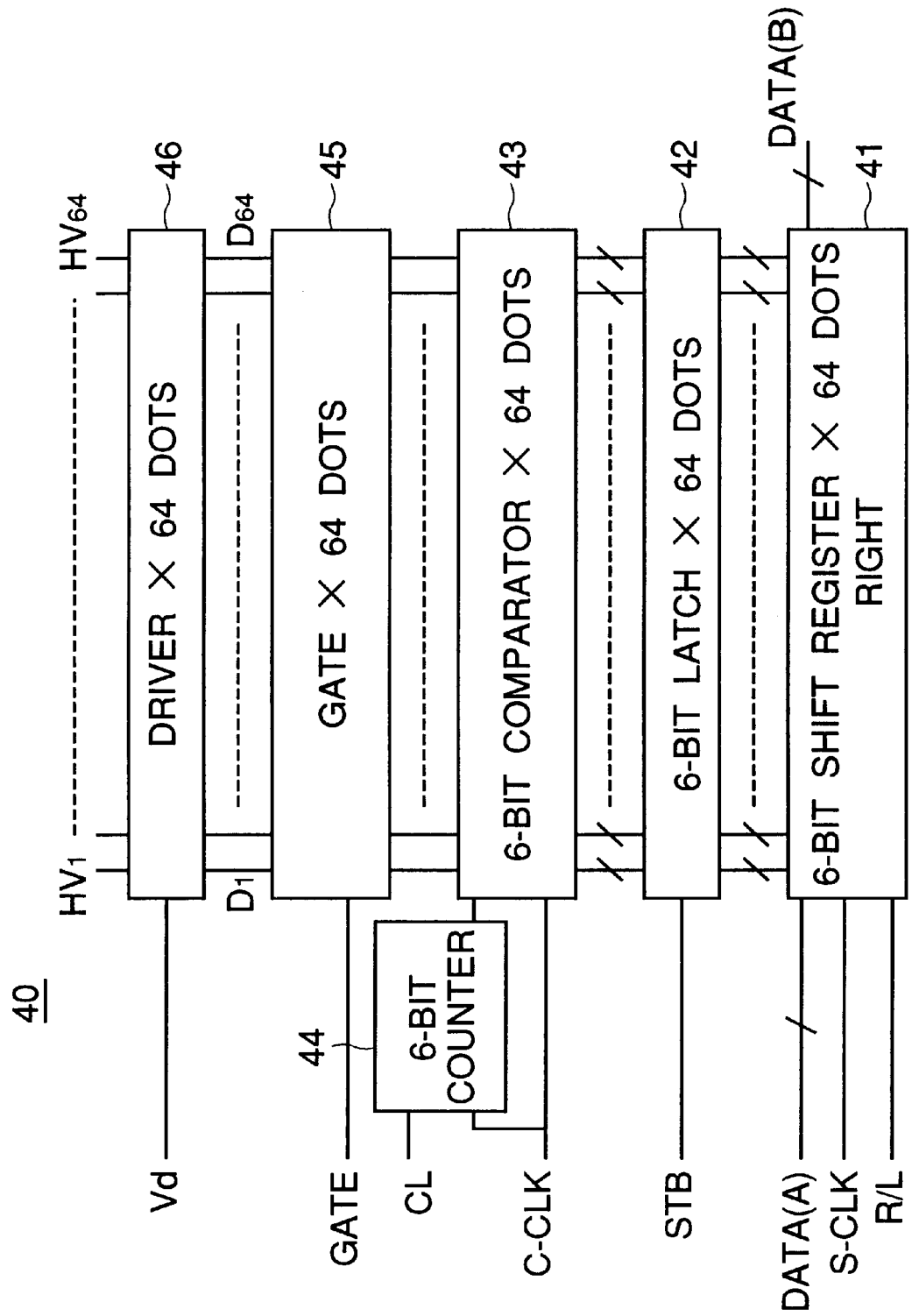
FIG. 4 is a block diagram of a driver IC for driving the PLZT print head.

In this embodiment, the 1024-step gradation is obtained by modulating the drive time of the PLZT optical shutters $B_1$ to $B_n$ and $A_1$ to $A_n$ by the pulse width. For such multi-value image reproduction, a driver IC 40 as shown in FIG. 4 is used as an example, and in one driver IC 40, image data of, for example, 6 bits and 64 dots are handled. To a shift register 41, image data corresponding to the PLZT optical shutters $B_1$ to $B_n$ in the row B or image data corresponding to the PLZT optical shutters $A_1$ to $A_n$ in the row A are input based on switching between R and L and a clock S-CLK.

When the input of the data is finished, data in the shift register 41 are input to a comparator 43 through a latch 42 under the control of a strobe signal STB. In conjunction with a 6-bit counter 44, the comparator 43 counts the light quantity level of the input image data as a digital value to be converted into the drive time based on a count lock C-CLK and a count signal CL corresponding to the predetermined number of steps of gradation.

Figure 5:
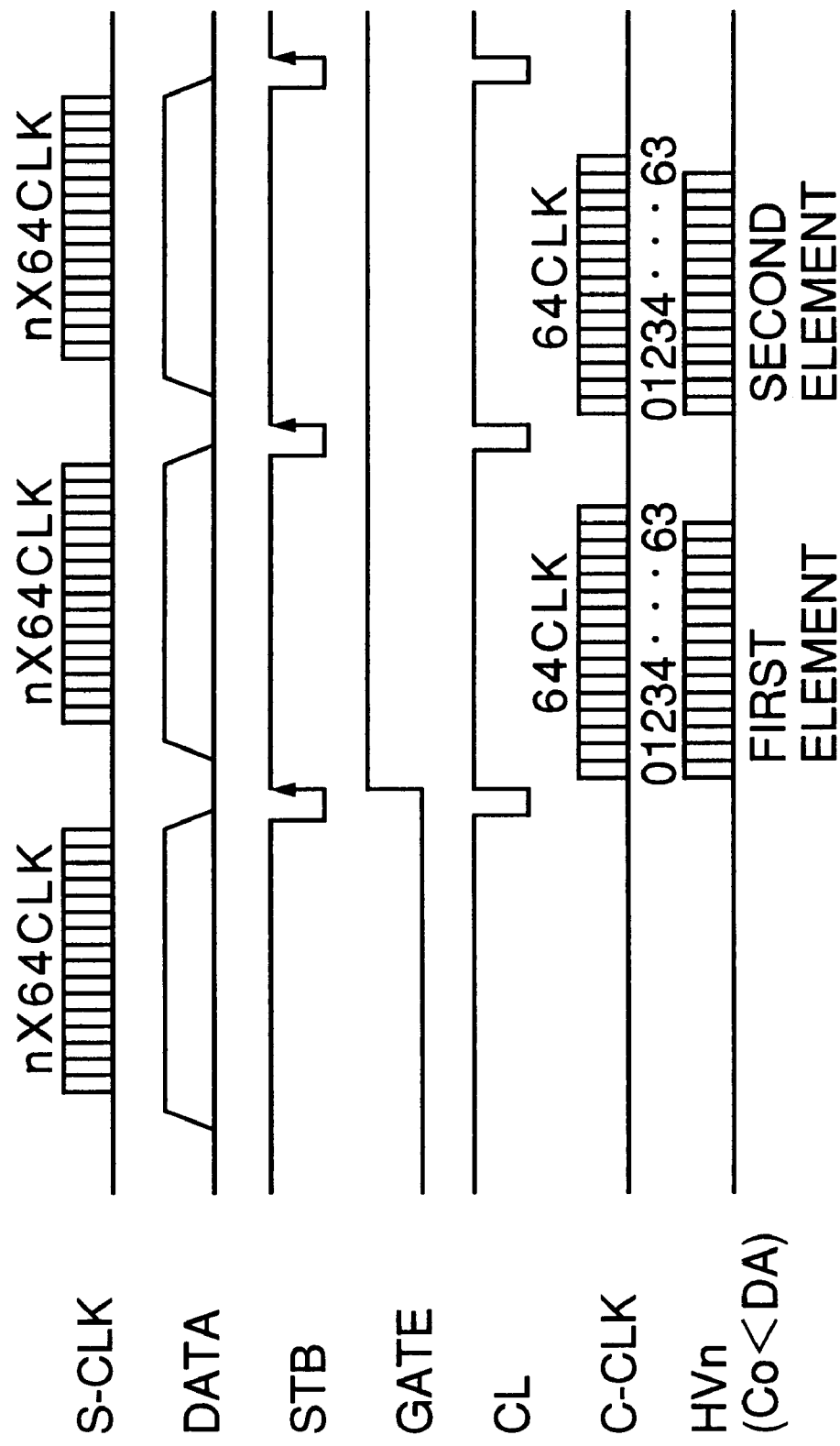
FIG. 5 is a time chart of an operation of the driver IC of FIG. 4.

The count data are output to a driver 46 through a gate 45 under the control of a gate signal GATE, and the corresponding ones of the optical shutters $B_1$ to $B_n$ and $A_1$ to $A_n$ are driven under a preset drive voltage Vd for a time corresponding to the light quantity level of the image data so that the optical output of the gradation corresponding to the image data is obtained. FIG. 5 shows a time chart of this control.

Figure 6:
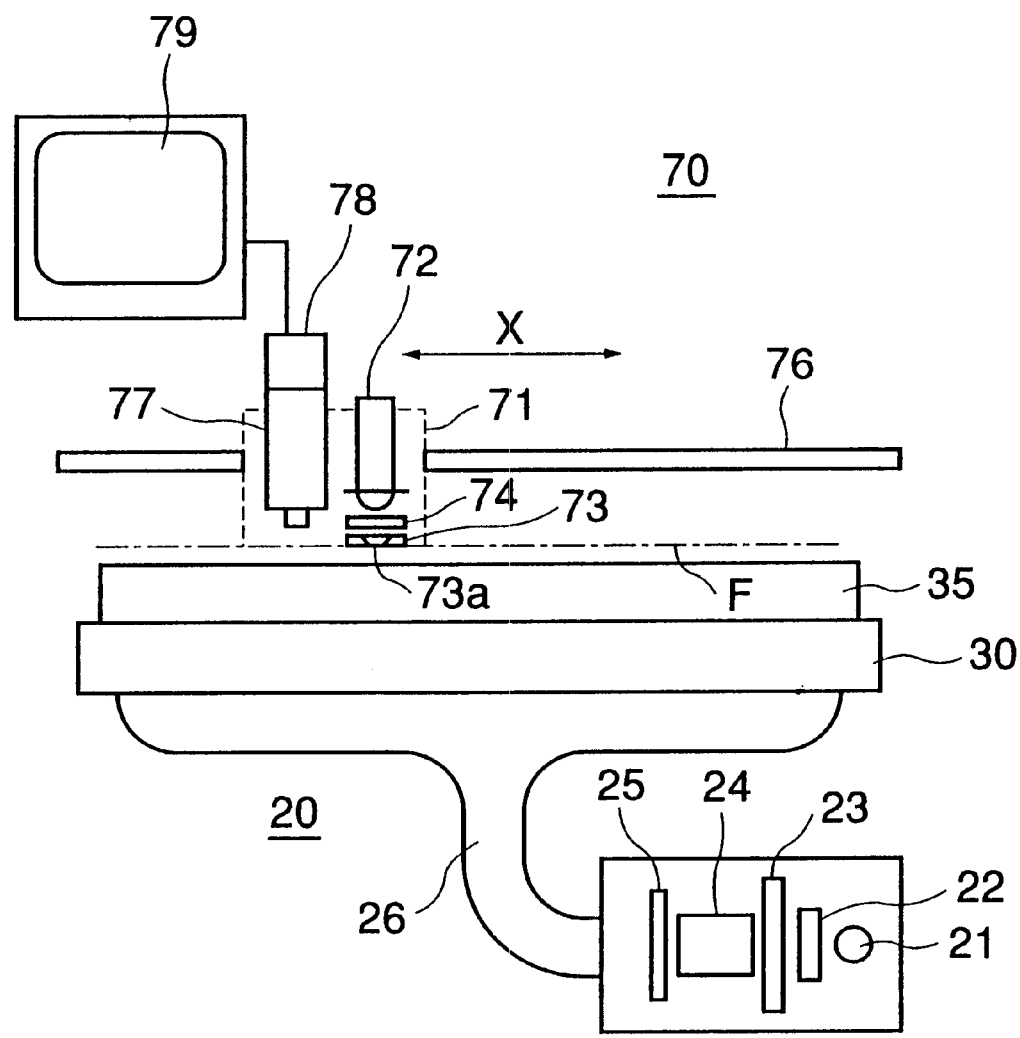
FIG. 6 briefly shows the structure of a measuring device for measuring the light quantity of the optical output of the PLZT print head of FIG. 1.

However, as mentioned above, there is a variation in the input and output characteristics of optical media such as the PLZT optical shutters and it is necessary to correct this. To correct this, the silver halide printer of this embodiment shown in FIG. 3 has a measuring device 70 as shown in FIG. 6 for measuring the variation in the optical outputs of the PLZT printer head 20. The measuring device 70 has a measuring head 71 that scans an imaging surface F for writing by the PLZT print head 20 in the X direction by a light receiving sensor 72 to detect the quantity of the light outputted from the PLZT optical shutters $B_1$ to $B_n$ and $A_1$ to $A_n$, and the scanning is performed by moving the measuring head 71 along a guide 76 in the X direction. The light receiving sensor 72 is situated above the measuring head 71, and detects the optical outputs of the PLZT optical shutters $B_1$ to $B_n$ and $A_1$ to $A_n$ through a mask hole 73a of a mask 73 and an imaging lens 74 situated on the imaging surface F to measure the light quantity distribution.

Figure 7:
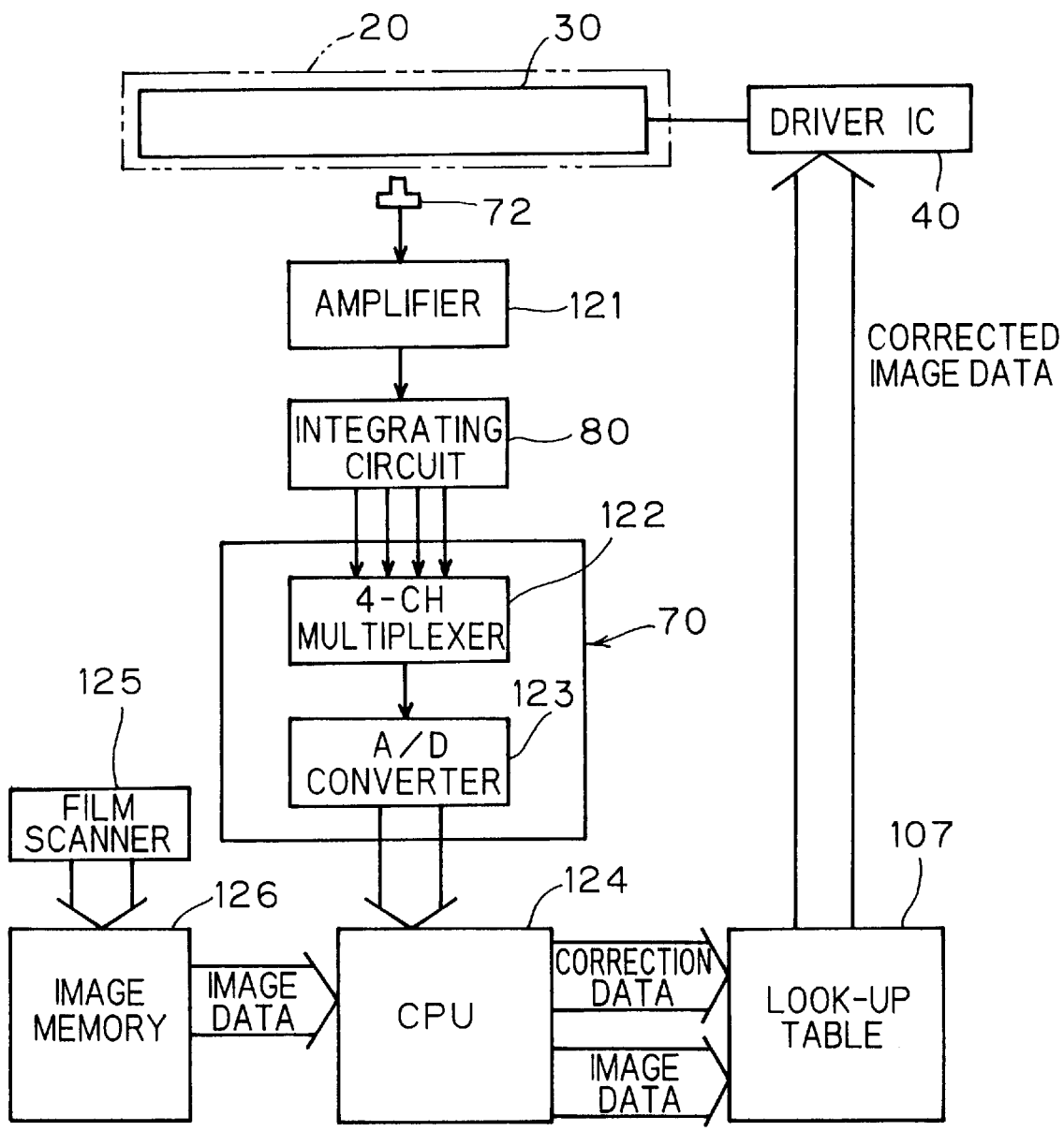
FIG. 7 is a block diagram briefly showing the structure of a controller of the silver halide printer of FIG. 3.
Figure 14:
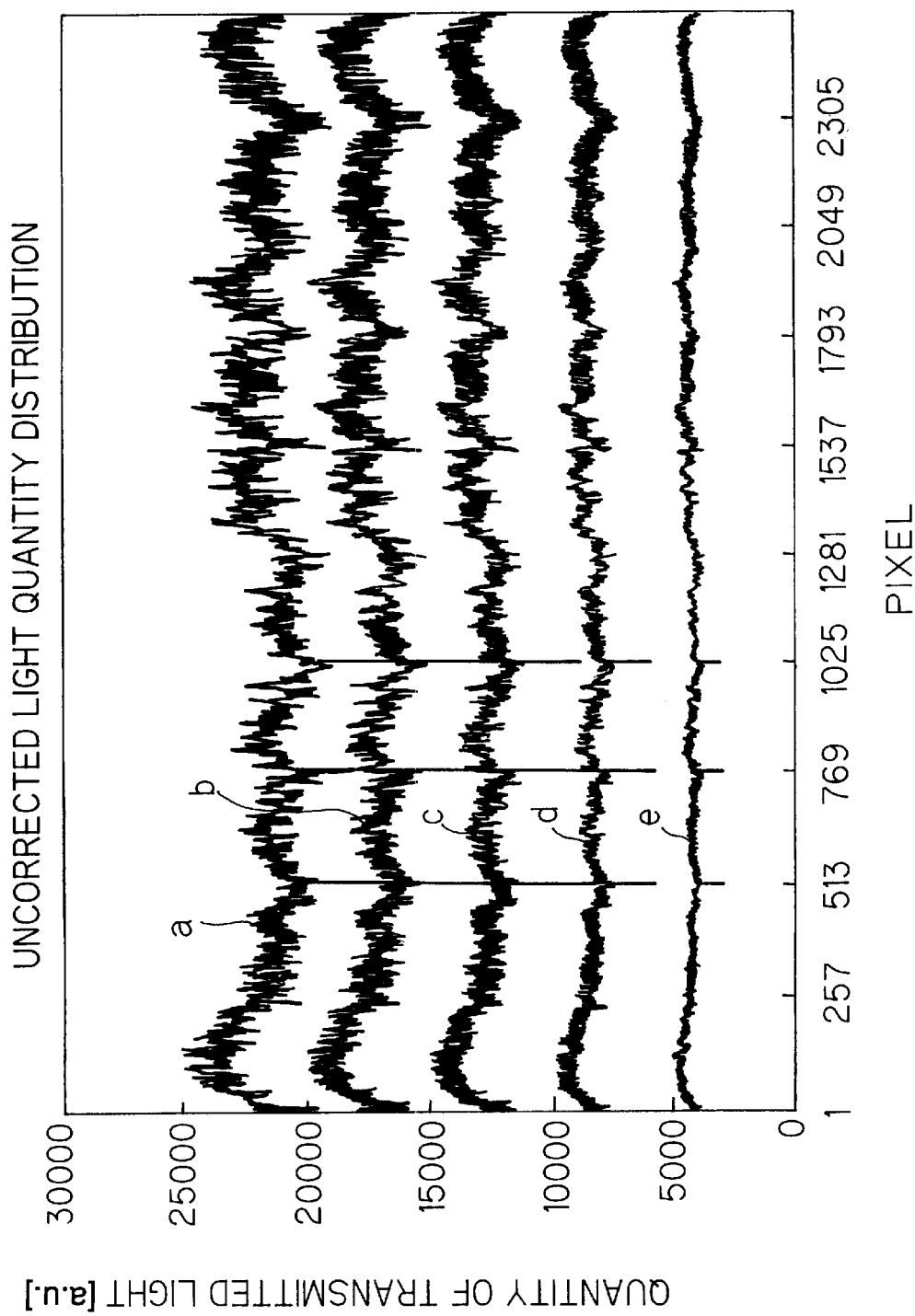
FIG. 14 is a graph showing a variation in the light quantities of the optical outputs in the PLZT print head in the gradation ranges.
Figure 15:
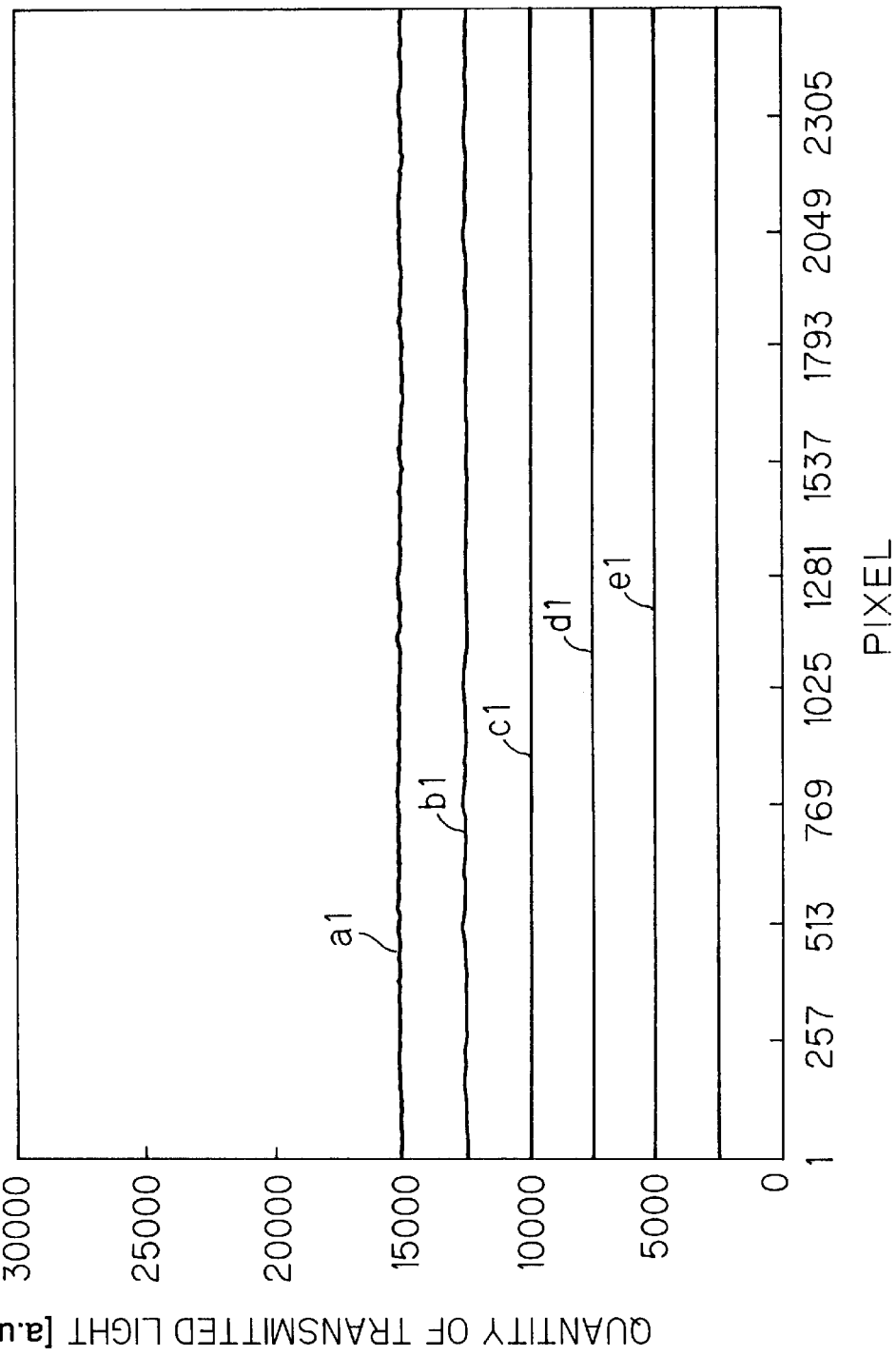
FIG. 15 is a graph showing the light quantity distribution of the optical output of the PLZT print head after the light quantity of the optical output of the PLZT print head shown in FIG. 14 is corrected by the conventional correcting method.

An example of the thus measured light quantity variation in the gradation ranges is the light quantity distribution as shown in FIG. 14 described in the prior art. The output from the light receiving sensor 72 in the measuring device 70 is inputted to a CPU 124 of a controller for operation control as shown in FIG. 7 provided in the silver halide printer of FIG. 3 and a necessary correction is automatically performed by an internal function thereof. The measuring head 71 is also provided with a CCD camera 77. The output of the camera 77 is outputted to a monitor 79 through a video controller 78 so that the device can perform measurement while monitoring the measurement condition. Such a measurement for the automatic correction is effective when performed in various timings such as at the start of every use, at a point of time corresponding to the use frequency such as the number of times of use or the time of use, and in a predetermined cycle, and can cope with a change in light quantity variation due to a condition change with time.

It is to be noted that the control for the correction may be performed by any type of device, such as a single device specifically designed for the control. Moreover, it is considered that the variation in the light quantities of the optical outputs in a solid-state scanning optical writing apparatus, which is peculiar to the solid-state scanning optical writing apparatus, does not largely change thereafter. Therefore, the following can be performed: The light quantity variation in each solid-state scanning optical writing apparatus is measured by a specifically designed measuring device; measurement data peculiar to each apparatus or correction data produced based on the measurement data are stored in a storage medium integrated into or separated from the corresponding solid-state scanning optical writing apparatus; and on the side of the control means of an apparatus provided with the solid-state scanning optical writing apparatus and used for image formation, the measurement data or the correction data particular to the solid-state scanning optical writing apparatus are taken in from the storage medium provided in the solid-state scanning optical writing apparatus, and a necessary correction is performed at the time of optical writing.

Figure 10A:
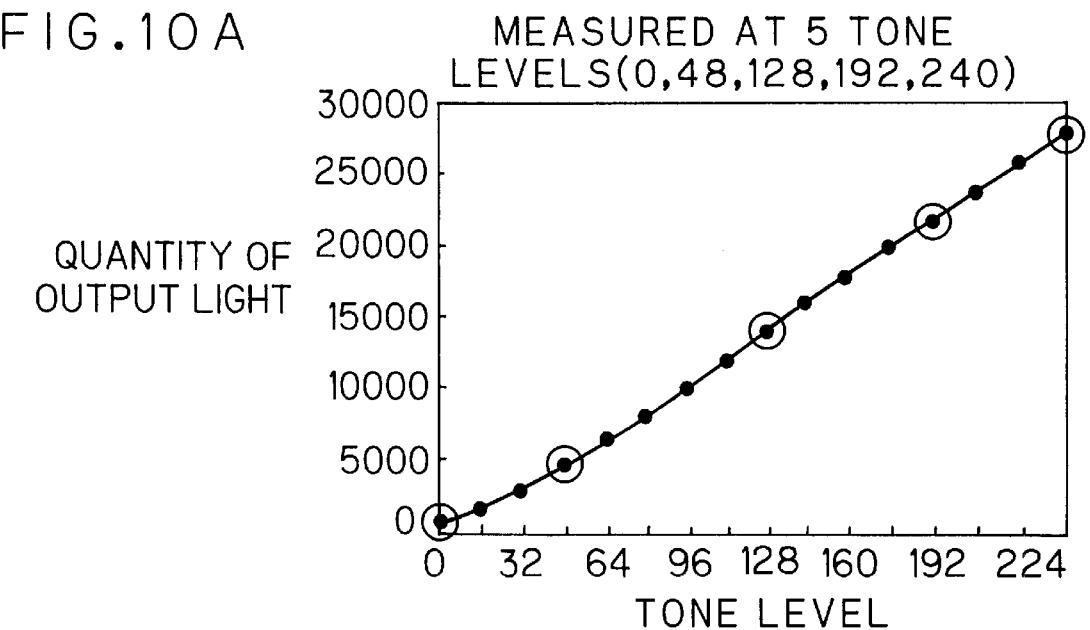
FIGS. 10A and 10B are graphs showing relationships between the actual characteristic line and the measurement points when an approximate curve method is applied in measuring the light quantity distribution of the PLZT print head.
Figure 10B:
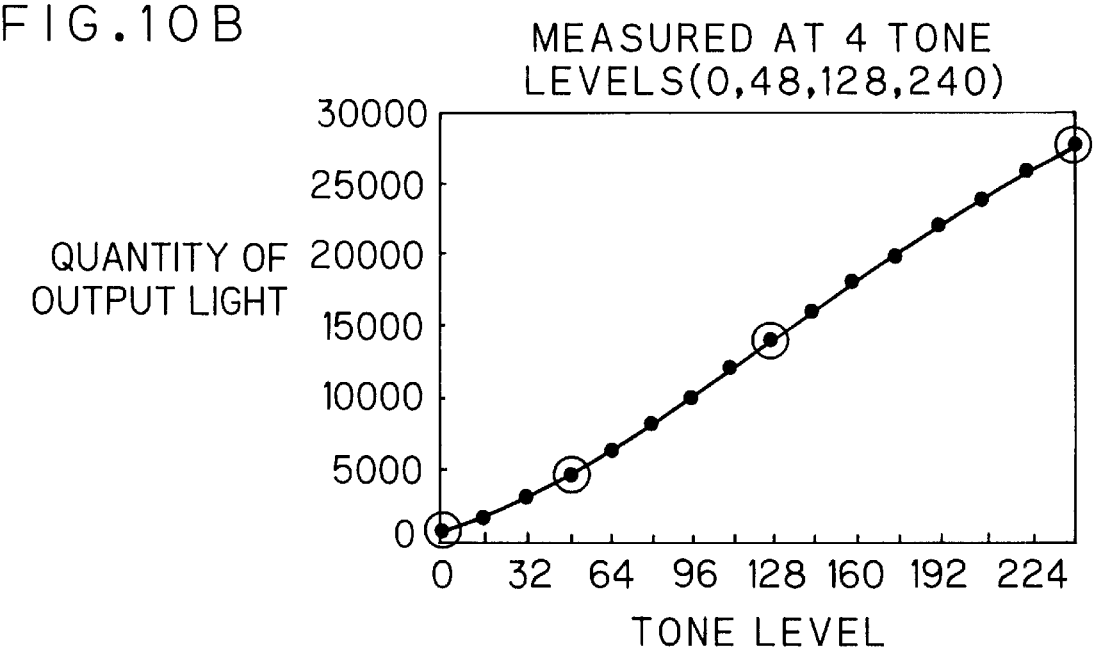

The light quantity correction of the halftone is performed, as shown in FIGS. 10A and 10B, by measuring the light quantity distributions at several points of gradation, on the actual light quantity distribution characteristic line, shown by double circles where attention is paid to positions with large changes, and employing a gradation curve calculating method by an approximate curve.

In this embodiment, to correct the variation in the light quantities of the optical outputs from the PLZT print head in the above-described manner, it is convenient to perform several characteristic corrections, and this is employed.

First, to correct the variation in the light quantities of the optical outputs as shown in FIG. 14 from the PLZT optical shutters $B_1$ to $B_n$ and $A_1$ to $A_n$, which is an example of the optical output medium, of the PLZT print head 20 which is an example of the solid-state scanning optical writing apparatus that performs optical writing by performing optical scanning in the X direction, for example, with respect to the light quantity variation in the gradation range shown by a in FIG. 14, in the gradation range whose light quantities are 25000 a.u. to 20000 a.u., the optical outputs at the PLZT optical shutters $B_1$ to $B_n$ and $A_1$ to $A_n$ exceeding 20000 a.u. are reduced so that the light quantities are made uniform to 20000 a.u., and in the gradation range whose light quantities are lower than 20000 a.u., the making uniform correction is not performed. The correction is made so that the light quantity distribution is as shown by a3 in FIG. 8 as a whole. Moreover, with respect to the light quantity variation in the gradation range shown by b in FIG. 14, in the gradation range whose light quantities are 20000 a.u. to 16000 a.u., the optical outputs at the PLZT optical shutters $B_1$ to $B_n$ and $A_1$ to $A_n$ exceeding 16000 a.u. are reduced so that the light quantities are made uniform to 16000 a.u., and in the gradation ranges whose light quantities are lower than 16000 a.u., the making uniform correction is not performed. The correction is made so that the light quantity distribution is as shown by b3 in FIG. 8 as a whole. The correction in the gradation ranges shown by c, d and e in FIG. 14 whose light quantities are not more than 20000 a.u. is performed so that the light quantities at all the pixels are made uniform as shown by c3, d3 and e3 in FIG. 8.

Thus, although the variation in the light quantities of the optical outputs from the PLZT optical shutters $B_1$ to $B_n$ and $A_1$ to $A_n$ are corrected, in specific gradation ranges, the light quantity levels of the optical outputs from the PLZT optical shutters $B_1$ to $B_n$ and $A_1$ to $A_n$ are not made uniform. Thereby, although a necessary correction is performed in the other gradation ranges, the average output level at the light quantity distribution in the gradation range shown by a in FIG. 14, which is approximately 23000 a.u., is reduced only to 20000 a.u. by the above-described correction, so that 86.95% can be used. As shown by a reference straight line g2 in FIG. 12, since a wide range from a gradation close to substantially 0 a.u. shown by a smallest light quantity line g3 in FIG. 12 which is an off output to a gradation of 20000 a.u. shown by a threshold value of largest light quantity line g1 in FIG. 12 can be allotted to the necessary 1024 steps of gradation, problems such as the reduction in the number of steps of gradation in use, the reduction in substantial contrast and the occurrence of the pseudo gradation that have conventionally been caused by making the light quantity levels uniform can be prevented.

Figure 11:
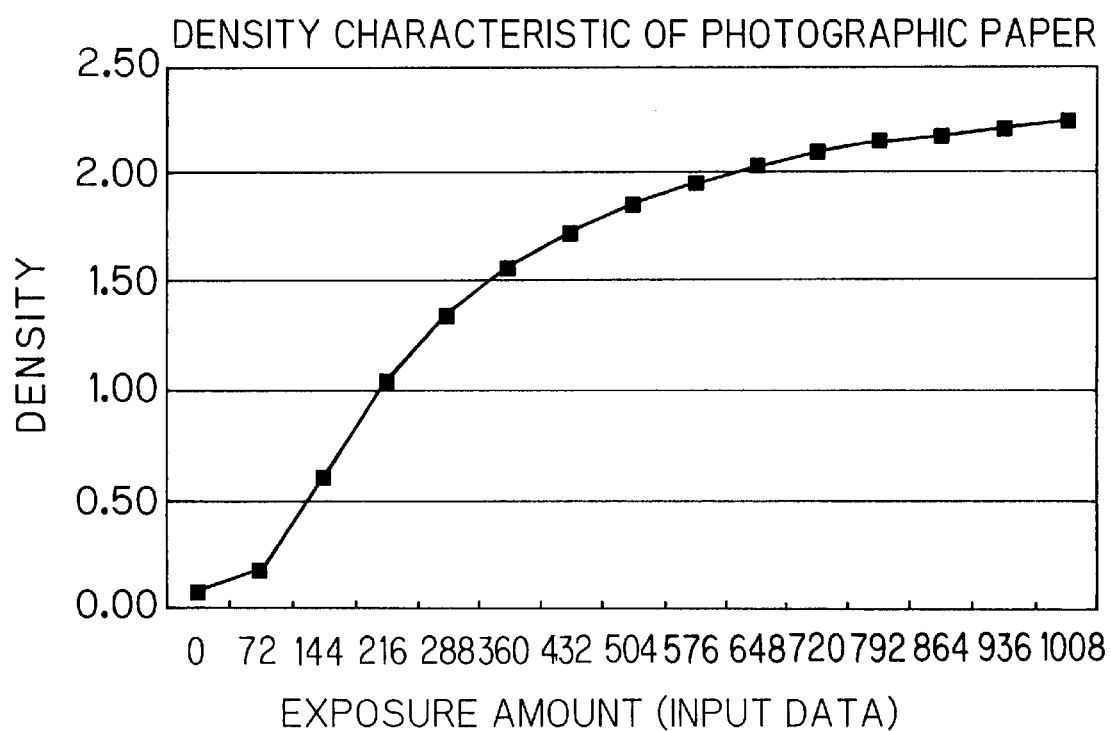
FIG. 11 is a graph showing an input and output characteristic of the photographic paper.
Figure 12:
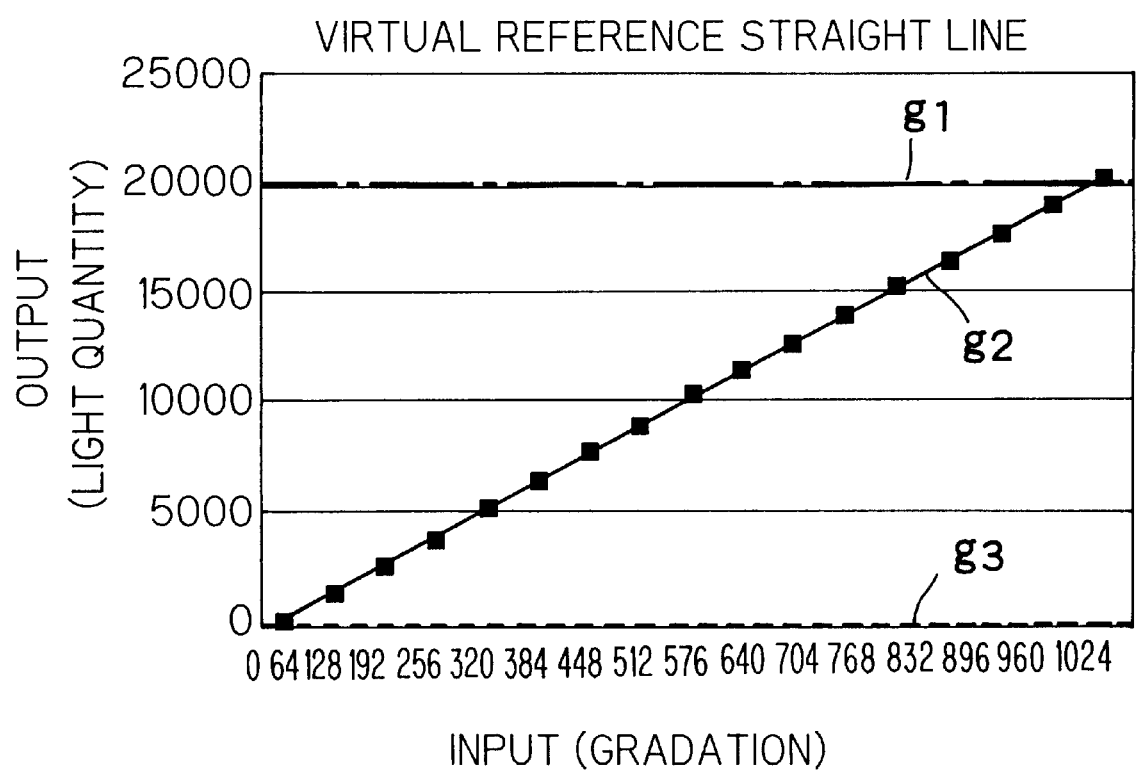
FIG. 12 is a graph showing a relationship between a gradation range in use after the light quantity correction and the number of steps of gradation corresponding thereto.

As shown in FIGS. 10A and 10B, the gradation ranges of the PLZT optical shutters $B_1$ to $B_n$ and $A_1$ to $A_n$ in which the making uniform correction is not performed are nonlinear gradation ranges in which the higher the gradation range is, the larger the noise being caused is as shown at the pixels 513, 769 and 1025 in high gradation ranges shown by a and b in FIG. 14, and an output density change is low compared to an input change in the high input range in the input and output characteristic of the photographic paper 4 as shown in FIG. 11. Therefore, when an image is formed on the photographic paper 4 by the PLZT print head 20 by performing optical writing while performing the above-described correction, the output density obtained on the photographic paper 4 is distributed as shown in FIG. 9, and a noise a3a left on a3 in FIG. 8 by the optical outputs of the PLZT print head 20 not being made uniform is reduced by being offset as shown by a noise a4a of the output density shown by a4 in FIG. 9 and a noise b3a left on b3 in FIG. 8 is reduced by being offset as shown by a noise b4a of the output density shown by b4 in FIG. 9, so that the influence caused by not performing the making uniform correction can be reduced.

Moreover, the specific gradation ranges correspond to ranges in which the output density variation with respect to the optical input variation of the photographic paper 4 which is an object onto which optical writing is to be performed is sufficiently small visually. Thereby, since the output density does not largely vary and noises are not visually discriminated even though the making uniform correction is not performed and noises are left, the influence caused by not performing the making uniform correction can be reduced.

Figure 8:
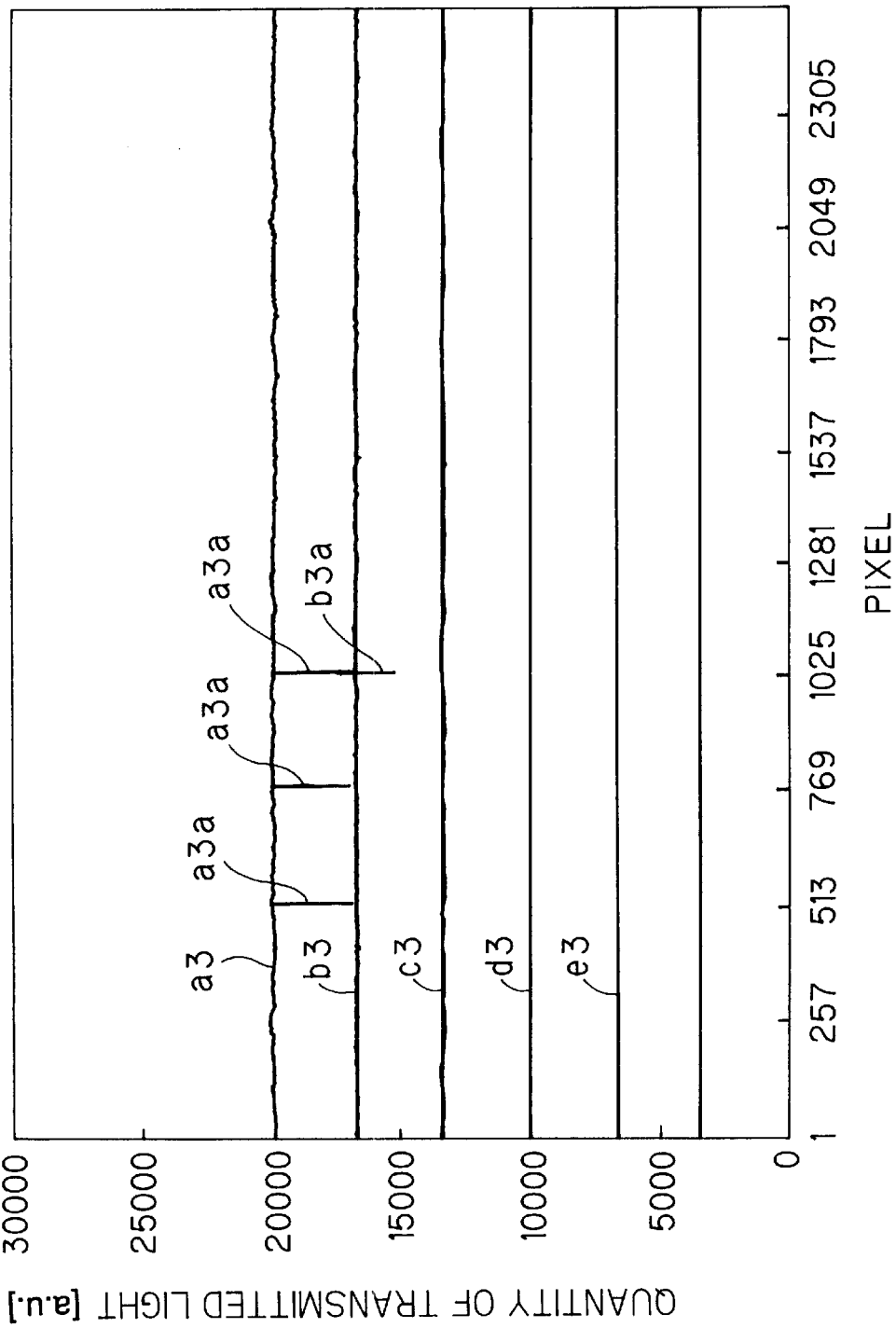
FIG. 8 is a graph showing the optical output of the PLZT print head after the light quantity correction of the optical output of the solid-state scanning optical writing apparatus is performed by the light quantity correcting method of this embodiment, that is, the distribution of the quantity of transmitted light.

As is apparent from comparison between FIGS. 14 and 8, in specific ranges of high gradation ranges such as the gradation ranges shown by a3, b3, c3, d3 and e3 in FIG. 8, by setting the corrected light quantity levels of the outputs from the PLZT optical shutters $B_1$ to $B_n$ and $A_1$ to $A_n$ which are optical output media at light quantity levels being brighter than the darkest light quantity level of those of all the pixels in target gradation ranges before correction, that is, in the specific ranges, in the case of an object, onto which optical writing is to be performed, having an input and output characteristic that the output density does not largely vary with respect to the inputs of the high gradation ranges, advantages produced by not performing the making uniform correction are delivered while the influence caused by not performing the making uniform correction with respect to the light quantity levels not more than the set level is relieved by the input and output characteristic with respect to the high gradation ranges of the object onto which optical writing is to be performed.

When a photoreceptor or the like for a case in which images are formed by an electrophotographic method having an input and output characteristic opposite to the one described above is used as the object onto which optical writing is to be performed, in specific gradation ranges of low gradation ranges, by setting the corrected light quantity levels of the outputs from the PLZT optical shutters $B_1$ to $B_n$ and $A_1$ to $A_n$ which are optical output media at light quantity levels being darker than the brightest light quantity level of those of all the pixels in target gradation ranges before correction, that is, the specific ranges, in the object, onto which optical writing is to be performed, such as a photoreceptor having an input and output characteristic that the output density does not largely vary with respect to the inputs of the low gradation ranges, advantages produced by not performing the making uniform correction are delivered while the influence caused by not performing the making uniform correction with respect to the light quantity levels not more than the set level is relieved by the input and output characteristic with respect to the low gradation ranges of the object onto which optical writing is to be performed.

Moreover, like the gradation ranges shown by c3, d3 and e3 in FIG. 8, in the gradation range in use, in the gradation ranges other than the high gradation ranges and the low gradation ranges, by making the corrected light quantity levels of the outputs from the optical output media uniform for all the pixels, although the making uniform correction is not performed, the output density variation due to the optical output variation can be prevented by the linear characteristic of the input and output characteristic of the object onto which optical writing is to be performed.

Figure 13:
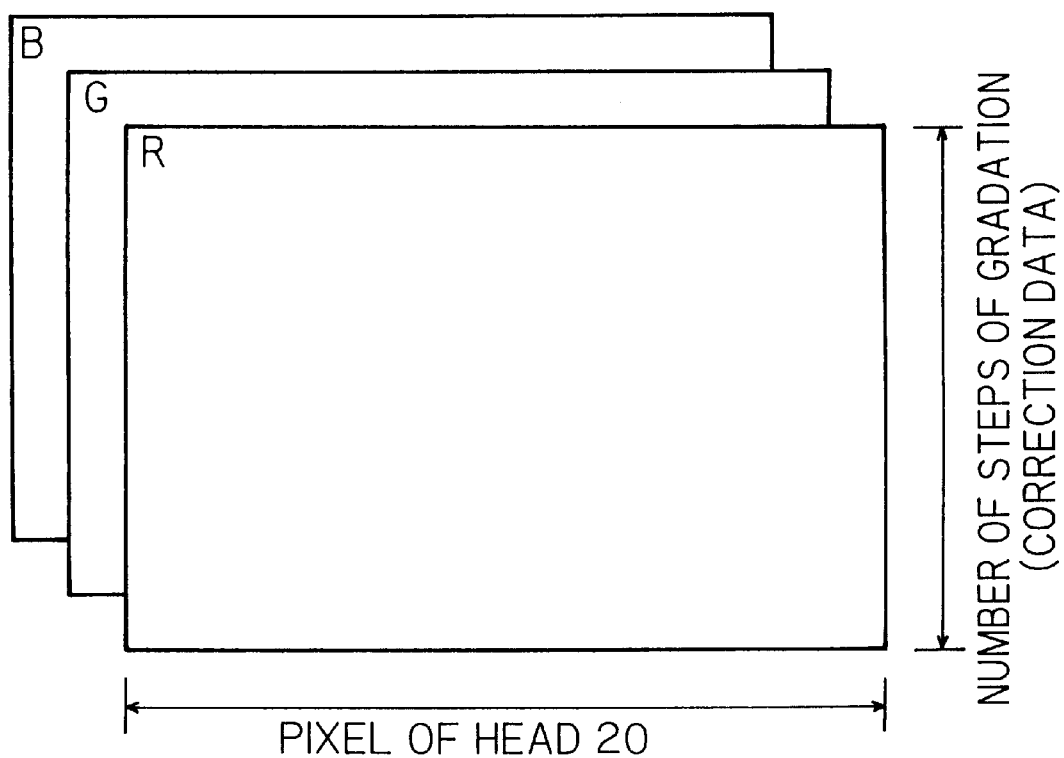
FIG. 13 shows look-up tables produced by the controller of FIG. 7 for the light quantity correction.

In the controller of the sliver halide printer shown in FIG. 7, after the data of a film image read out by a film scanner 125 are temporarily stored in an image memory 126, the data are inputted to the CPU 124 as image data, and based on the gradation of the inputted image data, the driver IC 40 is operated for a necessary time to drive the PLZT optical shutters $B_1$ to $B_n$ and $A_1$ to $A_n$ of the PLZT print head 20 to perform optical writing in accordance with the image data. To perform the light quantity correction in accordance with the variation in the light quantities of the optical outputs of the PLZT print head 20 in performing the optical writing, the optical outputs, of the three colors of R, G and B, of the PLZT print head 20 are received by the light receiving sensor 72 and the light quantities are detected. Then, the detected light quantities are successively inputted to a multiplexer 122 through an amplifier 121 and an integrating circuit 80, are A/D converted by an A/D converter 123, and are inputted to the CPU 124. At this time, the CPU 124 produces optical output correcting look-up tables R, G and B for three colors as shown in FIG. 13 from the inputted measurement data by applying the above-described correction methods, and stores them in a look-up table 107. Thereby, the CPU 124 performs the light quantity correction on the image data by use of the look-up table 107 every time the image data are inputted, and performs the driving of the PLZT print head 20 by the driver IC 40 based on the data having undergone the correction.

Obviously, many modifications and variations of the present invention are possible in light of the above teachings. It is therefore to be understood that within the scope of the appended claims, the invention may be practiced other than as specifically described.

What is claimed is:

1. A method of correcting output light quantities of a plurality of optical output media aligned in one direction in an optical writing apparatus that activates and deactivates the optical media in multi-gradation to thereby perform optical writing onto an object onto which writing is to be performed, said method comprising the steps of:

measuring the quantity of light outputted from each of the optical output media; and correcting a variation between the output light quantities of the optical output media based on a result of the measurement in a plurality of gradation ranges, wherein at said step of correcting, correction in a specific gradation range of the plurality of gradation ranges is performed so that the output light quantities of the optical output media are not made uniform.

2. A method as claimed in claim 1, wherein said specific gradation range is a gradation range where output from the optical output media is nonlinear with respect to input to the optical output media.

3. A method as claimed in claim 1, wherein said specific gradation range is a gradation range in which a variation in output density with respect to a variation in optical input of the object onto which writing is to be performed is sufficiently small visually.

4. A method as claimed in claim 1, wherein in said correcting step, when said specific gradation range is a high gradation range, correction is performed so that the output light quantities of the optical output media after correction are brighter than the darkest output light quantity in the high gradation range before correction.

5. A method as claimed in claim 4, wherein in said correcting step, in a gradation range other than said specific gradation range, correction is performed so that the output light quantities of the optical output media are made uniform.

6. A method as claimed in claim 1, wherein in said correcting step, when said specific gradation range is a low gradation range, correction is performed so that the output light quantities of the optical output media after correction are darker than the brightest output light quantity in the low gradation range before correction.

7. A method as claimed in claim 6, wherein in said correcting step, in a gradation range other than said specific gradation range, correction is performed so that the output light quantities of the optical output media are made uniform.

8. A method of correcting output light quantities of a plurality of PLZT optical shutters in an optical writing apparatus that activates and deactivates the optical shutters in multi-gradation to thereby perform optical writing onto an object onto which writing is to be performed, said method comprising the steps of:

measuring the quantity of light outputted from each of the optical shutters; and correcting a variation between the output light quantities of the optical shutters based on a result of the measurement in a plurality of gradation ranges, wherein at said step of correcting, correction in a specific gradation range of the plurality of gradation ranges is performed so that the output light quantities of the optical shutters are not made uniform.

9. A method as claimed in claim 8, wherein said specific gradation range is a gradation range where output from the optical shutters is nonlinear with respect to input to the optical shutters.

10. A method as claimed in claim 8, wherein said specific gradation range is a gradation range in which a variation in output density with respect to a variation in optical input of the object onto which writing is to be performed is sufficiently small visually.

11. A method as claimed in claim 8, wherein in said correcting step, when said specific gradation range is a high gradation range, correction is performed so that the output light quantities of the optical shutters after correction are brighter than the darkest output light quantity in the high gradation range before correction.

12. A method as claimed in claim 11, wherein in said correcting step, in a gradation range other than said specific gradation range, correction is performed so that the output light quantities of the optical shutters are made uniform.

13. A method as claimed in claim 8, wherein in said correcting step, when said specific gradation range is a low gradation range, correction is performed so that the output light quantities of the optical shutters after correction are darker than the brightest output light quantity in the low gradation range before correction.

14. A method as claimed in claim 13, wherein in said correcting step, in a gradation range other than said specific gradation range, correction is performed so that the output light quantities of the optical shutters are made uniform.

* * * * *